UNITED STATES PATENT OFFICE.

JOSEPH B. SHAW AND GEORGE A. BOLE, OF ALFRED, NEW YORK.

MAGNESIUM-OXYCHLORID CEMENT.

1,333,510.     Specification of Letters Patent.     Patented Mar. 9, 1920.

No Drawing.     Application filed February 24, 1919. Serial No. 278,858.

*To all whom it may concern:*

Be it known that we, JOSEPH B. SHAW and GEORGE A. BOLE, citizens of the United States, residing at Alfred, in the county of Allegany and State of New York, have invented new and useful Improvements in Magnesium-Oxychlorid Cement, of which the following is a specification.

Our present invention relates to the art of manufacturing magnesium oxychlorid cement or Sorel cement, and its object is to enable such a cement to be produced at less cost than has been possible heretofore.

The value of magnesium oxychlorid as a cement for flooring and other purposes has been recognized for many years, it being decidedly superior to Portland cement. It has been made heretofore by calcining magnesite ($MgCO_3$) at a relatively low temperature and mixing the resulting magnesium oxid ($MgO$) with a solution of magnesium chlorid. This mixture hardens forming a very tough and durable cement. It is sold under various trade names such, for example as "artificial marble". However, in spite of the high qualities of magnesium oxychlorid cement, it has not been used extensively partly because of the high cost of the raw materials used in its manufacture and partly because of poor results obtained from the materials used. The deposits of magnesite are far removed from the centers of consumption of the cement and the resulting cost of transportation of the raw materials has made the cement too expensive to compete with Portland cement, nothwithstanding the superior quality of the magnesium oxychlorid cement.

Heretofore only high grade magnesite containing a relatively low percentage of calcium carbonate has been used for the manufacture of magnesium oxychlorid cement, because it has been generally understood that calcium carbonate in the magnesite acts not only as a diluent, decreasing the percentage of active magnesium oxid, but it also causes shrinkage in setting, thus producing cracks and otherwise weakening the cement. We have discovered, however, that calcium carbonate will produce no detrimental effect upon the cement other than as a diluent, if the material is calcined under certain properly controlled conditions. This discovery enables many inexpensive and easily obtained materials to be used in the manufacture of magnesium oxychlorid cement, as all magnesium or dolomitic limestones may be so used, extensive deposits of such limestones being very widely distributed and readily available within the vicinities of the industrial centers of the United States. These magnesian or dolomitic limestones may be distinguished from magnesites by the fact that the former contain a higher percentage of calcium carbonate than of magnesium carbonate. We have found that it is possible to control the temperature of calcination of such limestones so that the magnesium carbonate is decomposed to form magnesium oxid while the calcium carbonate is left undecomposed and hence no calcium oxid which would be detrimental to the cement is liberated. This result is obtained because magnesium carbonate decomposes at a lower temperature than calcium carbonate. This calcined limestone after grinding to a powder combines with alkaline earth chlorid to form a hard oxychlorid cement.

In carrying out our process we preferably use magnesian limestone, a high percentage of magnesium carbonate being desirable, such limestone being crushed or otherwise reduced to pieces of about a half inch across, and the crushed or reduced material is calcined at a temperature ranging between 500° C. and 815° C. Between these temperature limits all of the magnesium carbonate may be decomposed while none of the calcium carbonate will be decomposed. The calcination requires extreme care and accurate control. The practice of mixing the fuel with the limestone cannot be used because while the general temperature of the mass may be kept down to the proper temperature, yet any particle of the limestone in contact with the fuel will be heated too highly at the instant of combustion and the calcium carbonate will be decomposed. Also flame cannot be passed through the mass of limestone to calcine it unless its temperature is reduced below 815° C. before it comes into contact with the limestone. Preferably, the limestone is calcined in a muffle where it does not come into contact with the fuel or the flame. It is necessary to carefully control the conditions of calcination, in some manner similar to that just described; otherwise some calcium carbonate will be decomposed even though the general temperature may not exceed a dark red heat. The material calclined under the proper temperature control, as described, is composed of magnesium oxid and calcium carbonate and such other impurities as were present in the original limestone. Sometimes a small amount of the magnesium carbonate may remain undecomposed. No calcium oxid, however, will be present unless the temperature of some portion of the stone has been heated above 815° C. If any appreciable amount of calcium oxid is present, the material will not make a good oxychlorid cement.

After crushing to a powder the material is ready for use. To make the cement, the calcined limestone is wet with a solution of one or more of the alkaline earth chlorids, preferably magnesium or calcium chlorid or a mixture of magnesium and calcium chlorid of a specific gravity, preferably of 20° to 30° Baumé. This mixture will form a hard cement capable of being polished to a brilliant surface like marble. The calcined limestone may be used alone or mixed with some inert material to serve as a filler. We have found that a solution of calcium chlorid may be used to replace the magnesium chlorid and give a good cement. We have also found that a mixture of magnesium chlorid and calcium chlorid in almost any proportion may be used to give a good cement. Since calcium chlorid is a by-product of some manufacturing operations, it may be cheaply obtained. Where calcined magnesite is used as a source of magnesium carbonate, such calcined magnesite is treated with calcium chlorid, or with a mixture of calcium chlorid and magnesium chlorid in which mixture, the percentage of calcium chlorid is greater than that of magnesium chlorid, and a good cement may thus be obtained.

We claim as our invention—

1. The process of making oxychlorid cement which comprises calcining magnesian limestone under conditions which will decompose the magnesium carbonate contained therein and will leave the calcium carbonate therein substantially undecomposed, and incorporating with such calcined material a mixture of chlorids, more than 50% of which is calcium chlorid.

2. The process of making oxychlorid cement which comprises calcining magnesian limestone under temperature conditions which will decompose the magnesium carbonate therein to form magnesium oxid and will leave the calcium carbonate therein substantially undecomposed, and mixing with such calcined material a mixture of alkaline earth chlorids, more than 50% of which is calcium chlorid.

3. The process of making oxychlorid cement which comprises calcining magnesian limestone at a temperature between 500° C. and 815° C., and incorporating with such calcined material a mixture of chlorids, more than 50% of which is calcium chlorid.

4. The process of making oxychlorid cement which comprises calcining magnesian limestone at a temperature between 500° C. and 815° C. while the mass is out of contact with the heating fuel or flame, and incorporating with such calcined material a mixture of chlorids, more than 50% of which is calcium chlorid.

5. The process of making oxychlorid cement which comprises treating magnesian limestone calcined substantially as described with a mixture of chlorids more than 50% of which is calcium chlorid.

6. The process of making oxychlorid cement which comprises treating calcined magnesium carbonate with a mixture of calcium chlorid and magnesium chlorid in which the percentage of calcium chlorid is greater than magnesium chlorid.

7. The process of making oxychlorid cement which comprises treating a material containing magnesium oxid with a mixture of calcium chlorid and magnesium chlorid, in which mixture the percentage of calcium chlorid is greater than that of the magnesium chlorid.

8. The process of making oxychlorid cement which comprises treating a material containing magnesium oxid with a mixture of chlorids in which mixture calcium chlorid is in excess.

9. As an article of manufacture, an oxychlorid cement made by treating magnesian limestone calcined substantially as described, with a mixture of chlorids more than 50% of which is calcium chlorid.

10. As an article of manufacture, an oxychlorid cement made by treating a material containing calcined magnesium carbonate with a mixture of alkaline earth chlorids in which calcium chlorid is in excess.

11. As an article of manufacture an oxychlorid cement made by treating calcined magnesium carbonate with a mixture of calcium chlorid and magnesium chlorid in which the per cent. of calcium chlorid is greater than that of the magnesium chlorid.

In testimony whereof we have hereunto set our hands in presence of two subscribing witnesses.

JOSEPH B. SHAW.
GEORGE A. BOLE.

Witnesses:
Booth C. Davis,
B. B. Palmer.